United States Patent
McKinney et al.

(10) Patent No.: US 6,373,058 B1
(45) Date of Patent: Apr. 16, 2002

(54) METHOD OF REDUCING INFRARED VIEWABILITY OF OBJECTS

(76) Inventors: Richard A. McKinney, 50 Goat Island Ct., Clarksville, VA (US) 23927; Yvonne G. Bryant, 316 Lord Berkley Rd., Raleigh, NC (US) 27610; David P. Colvin, 123 Harmony Hill La., Cary, NC (US) 27513

(*) Notice: Subject to any disclaimer, the term of this patent is extended or adjusted under 35 U.S.C. 154(b) by 0 days.

(21) Appl. No.: 09/374,361

(22) Filed: Aug. 13, 1999

Related U.S. Application Data

(60) Provisional application No. 60/096,670, filed on Aug. 15, 1998.

(51) Int. Cl.$^7$ ................................. F41H 3/00
(52) U.S. Cl. ................ 250/342; 250/343; 250/482.1; 359/360; 252/587
(58) Field of Search ............... 250/342, 343, 250/482.1; 359/360; 252/587

(56) References Cited

U.S. PATENT DOCUMENTS

| | | | | |
|---|---|---|---|---|
| 4,953,922 A | * | 9/1990 | Granqvist | 359/360 |
| 5,401,976 A | * | 3/1995 | Bannasch | 250/342 |
| 5,614,340 A | * | 3/1997 | Bugner et al. | 252/587 |

* cited by examiner

*Primary Examiner*—Constantine Hannaher
*Assistant Examiner*—Andrew Israel
(74) *Attorney, Agent, or Firm*—Robert G. Rosenthal

(57) ABSTRACT

A method of camouflaging an object emitting infrared radiation by absorbing radiation or by altering its emissive pattern reduces its viewability by an infrared detector. An infrared radiation absorbing and/or altering layer containing microcapsules (10) is positioned proximate the infrared radiation source. The radiation is absorbed by means of a phase change material or plastic crystals. Concentrations and/or phase change materials are varied to enhance camouflage.

16 Claims, 1 Drawing Sheet

METHOD OF REDUCING INFRARED VIEWABILITY OF OBJECTS

This application claim benefit to provisional application No. 60/096,670 Aug. 15, 1998.

FIELD OF THE INVENTION

The present invention relates generally to the field of camouflage and more particularly to reducing or eliminating the infrared signature of objects.

BACKGROUND OF THE INVENTION

It is known that equipment such as boats, vehicles, tanks, guns and aircraft as well as people emit infrared (IR) radiation, the amount of which is directly related to the quantity of heat generated and radiated. This radiation, in turn, is related to the temperature of the radiating surface, its emissivity and geometrical view factor according to the Stefan-Boltzman Law in which the temperature raised to the forth power is the overriding parameter.

It is also known that the foregoing may be placed under surveillance by employing IR viewing methods such as "night vision" goggles or forward looking infrared (FLIR) equipment. For example, the Sidewinder missile is a heat-seeking rocket that utilizes infrared heat sensors to detect the presence of enemy aircraft for the purpose of effecting the destruction thereof. In addition, military or paramilitary groups employ night vision goggles to locate persons and equipment for the purpose of surveillance or destruction thereof.

In view of the foregoing, it would be of commercial or strategic value to enable one to mask the IR signature or viewability of an object or person for a period of time in order to evade detection.

It is accordingly an object of the present invention to provide a method of infrared shielding or camouflage that is an improvement over the prior art.

It is another object of the present invention to provide a method of infrared shielding or camouflage that is passive.

A still further object of the present invention is to provide a method of infrared shielding or camouflage that is inexpensive.

Yet an other object of the present invention is to provide a method of infrared shielding or camouflage that is easy to use.

SUMMARY OF THE INVENTION

The benefits and advantages of the present invention are achieved by a method of camouflaging an object emitting infrared radiation so as to decrease the infrared viewability thereof by an infrared detector. According to the method, an infrared radiation layer is positioned proximate the infrared radiation source such that infrared radiation is absorbed by the layer. The infrared radiation absorbing layer includes a phase change material or plastic crystals. In one embodiment of the invention, the phase change comprises paraffinic hydrocarbons which may be microencapsulated, depending upon the specific application.

BRIEF DESCRIPTION OF THE DRAWINGS

Some of the objects of the invention having been stated, other objects will appear as the description proceeds when taken in connection with the accompanying drawings in which.

DETAILED DESCRIPTION OF THE PREFERRED EMBODIMENTS

While the present invention will be described more fully hereinafter, it is to be understood at the outset that persons of skill in the art may modify the invention herein described while still achieving the favorable results of this invention. Accordingly, the description which follows is to be understood as being a broad teaching disclosure directed to persons of skill in the appropriate arts, and not as limiting upon the present invention.

Figure 1:
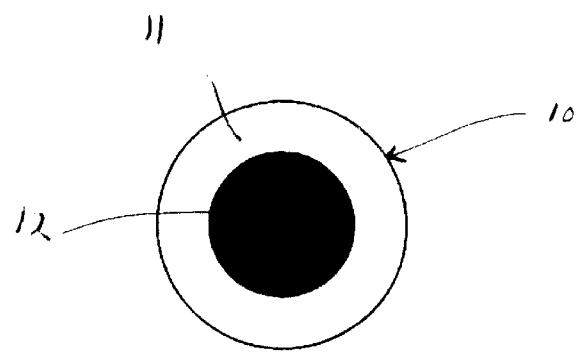
FIG. 1 is a cross section of a microcapsule according to the present invention containing a phase change material.
Figure 2:
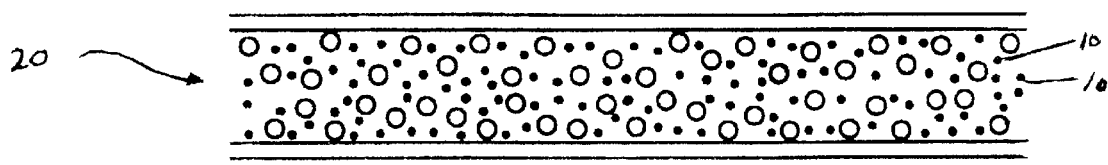
FIG. 2 is a sectional view of a foam according to the present invention containing a microencapsulated phase change material.
Figure 3:
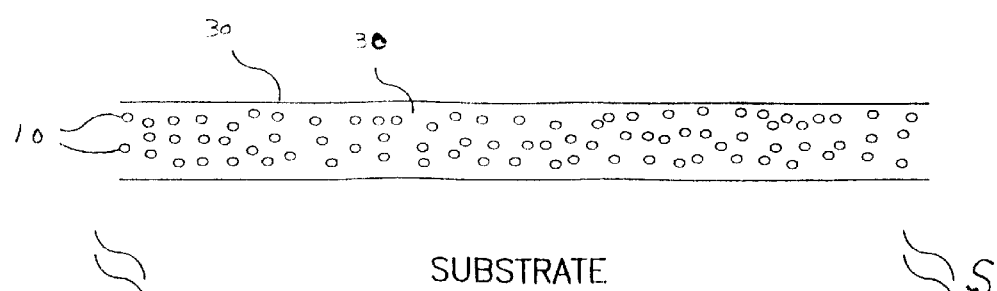
FIG. 3 is a sectional view of a substrate coated with a base material loaded with microencapsulated phase change material according to the present invention.

Referring more specifically to the drawings, a couple of generic embodiments of the invention are there illustrated. In FIG. 2, a plurality of microcapsules 10 having a wall 11 and containing a phase change material 12 are embedded within a foamed substrate 20. Similarly, in FIG. 3, a plurality of microcapsules are embedded within a binder 30 that is applied to a substrate.

The manufacture of microcapsules (a solid walled sphere containing a thermal energy absorbing material) is well known to those skilled in the art. A variety of inorganic and organic materials can be used as wall materials, but polymeric substances are used most frequently. The wall material is selected appropriately depending upon the physical properties of the core material. If the core material is oleophilic, a hydrophilic polymer is used as the wall material. When an aqueous solution is used as the core material, a water-insoluble synthetic polymer is used as the wall material. As employed herein, microcapules containing a suitable phase change material such as a paraffinic hydrocarbon may be obtained from Frisby Technologies Corporation of Bay Shore, New York as well as other suppliers.

According to the present invention, an object emitting infrared radiation is camouflaged in order to decrease the infrared viewability thereof. More specifically, heat emitting objects (and as employed herein, objects is intended to include animals and humans) are detectable using recently developed infrared detecting techniques such as night vision goggles, infrared sensors and infrared detecting radar. The detectability of objects is proportional to the amount of infrared radiation or heat emitted, the nature and view factor of the surface and primarily from the temperature raised to the forth power of the radiating surface. According to the present invention, the object to be camouflaged is coated or covered with a heat absorbing layer or shield that will absorb the emitted heat, and for a period of time which is engineered, the side of the object that is presented to the potential infrared detector remains cool, and therefore, confused or undetectable to the infrared sensor. The infrared absorbing layer is placed the infrared radiation source and between the infrared radiation source and the detector.

The infrared absorbing layer is in infrared radiation absorbing relation (i.e., proximate or in contact with) the heat source (i.e., the infrared radiation source) and includes an infrared absorbing material, such as a foam or textile material containing microencapsulated eicosane. In addition, plastic crystals such as 2,2-dimethyl-1,3-propanediol (DMP) and 2 hydrolymethyl-2-methyl-1, 3propanediol (HMP) and the like may be incorporated into the infrared absorbing layer. When plastic crystals absorb thermal energy, the molecular structure is temporarily modified without changing the phase of the material. For high temperature applications low melting point eutectic metals such as low melting point solders may be employed.

In another aspect of the invention, the composition of the phase change material (organic or synthetic) may be modified to obtain optimum thermal properties given the expected thermal load from the heat source. For example, the melting point of a homologous series of paraffinic hydrocarbons is directly related to the number of carbon atoms as shown in the following table:

| Compound Name | Number of Carbon Atoms | Melting Point (Degrees C.) |
| --- | --- | --- |
| n-Octacosane | 28 | 64.1 |
| n-Heptacosane | 27 | 59.0 |
| n-Hexacosane | 26 | 56.4 |
| n-Pentacosane | 25 | 53.7 |
| n-Tetracosane | 24 | 50.9 |
| n-Tricosane | 23 | 47.6 |
| n-Docosane | 22 | 44.4 |
| n-Heneicosane | 21 | 40.5 |
| n-Eicosane | 20 | 38.6 |
| n-Nonadecane | 19 | 32.1 |
| n-Octadecane | 18 | 28.2 |
| n-Heptadecane | 17 | 22.0 |
| n-Hexadecane | 16 | 18.2 |
| n-Pentadecane | 15 | 10.0 |
| n-Tetradecane | 14 | 5.9 |
| n-Tridecane | 13 | −5.5 |

In addition to the paraffinic hydrocarbons listed above, other paraffinic hydrocarbons having a greater (or lesser) number of carbon atoms having a higher (or lower) melting point may also be employed in practicing the invention. Each of the above materials can be separately encapsulated and is most effective near the melting point indicated. It will be seen from the foregoing that the effective temperature range of the infrared energy absorbing layer can, therefore, be tailored to a specific environment by selecting the phase change materials required for the corresponding temperature and adding phase change material thereto as needed. It will also be noted that a number of factors need to be taken into consideration when designing an infrared absorbing layer for a particular application such as, the temperature of object to be shielded, the ambient temperature, the amount of ventilation and the length of time that shielding is required.

The paraffinic hydrocarbons are generally most effective, have a longer life and therefore greatest repeatability of performance upon thermal cycling when microencapsulated or macroencapsulated. As employed herein, the term microencapsulated refers to capsule diameters of 1000 microns (1.00 mm) or less and macrocapsules are over 1000 microns. When the infrared radiation absorbing layer takes the form of a paint, the microcapsules are mixed into the paint prior to application to the substrate and are permitted to dry in situ with the paint. Note that the microcapsules may be added to the visual camouflage paint and applied simultaneously therewith. Similarly, the microcapsules may be added to a liquid polymer which is then foamed in order to form a foam or may be added to a foam by other means, such as skiving. In another embodiment of the invention, the microcapsules may be mixed in with a liquid rubber prior to curing.

In other aspects of the invention, the mircocapsules may be employed in combination with fabrics and/or fibers. The microcapsules are added to the resin which is then extruded and cured to form fibers. In another embodiment, the microcapsules are added to a curable resin that is then applied as a coating to the surface of a substrate such as a fabric. In addition, the microcapsules may be added to a foamable material which is then applied to the surface of a fabric and foamed.

Thus, it will be seen from the foregoing that the addition of microcapsules 10 containing a phase change material 12 is an easily adaptable concept that may take may forms. However, the particular embodiment will have to be engineered, depending on the particular parameters of the application. Notwithstanding the foregoing, this is well within the skill of those trained in field of thermodynamics.

In experiments that were conducted, a piece of cloth containing microencapsulated phase change material was applied to a heated strip and viewed with the forward looking infrared radar (FLIR). The strip was not observable by the radar.

In another experiment, a piece of fabric containing microencapsulated phase change material was draped over the engine of a small boat. Once again, the fabric was able to mask, camouflage or shield the heated objects from observation for varying periods of time. In another aspect of the invention, a paint containing microencapsulated phase change materials that melt at different temperatures may be applied to a surface in order to produce a camouflage pattern wherein different camouflage colors contain different microencapsulated phase change materials. For example, a visible green paint could contain micro PCM's which hold a first temperature (i.e., melt at a first second temperature), and wherein a visible grey paint could contain micro PCM's which hold a second temperature (i.e., melt at a second temperature) such that the visible camoflage and infrared camoflage produce similar patterns in the respective visible and infrared spectrums. It will therefore be seen that complex infrared camoflage patterns can be created by employing microencapsulted phase change materials have differing melting temperatures. In addition, infrared camoflage can be further enhanced by varying the concentrations of the various microencapuslated phase change materials which are dispersed in the various paint colors. From the foregoing, it will be noted that as the microencapsulated phase materials are subjected to a thermal load over time, the perceived infrared pattern will change, thus adding an additional layer of camouflage and adding to the confusion.

The foregoing embodiments and examples are to be considered illustrative, rather than restrictive of the invention, and those modifications which come within the meaning and range of equivalence of the claims are to be included therein.

That which is claimed is:

1. A method of camouflaging an object emitting infrared radiation so as to alter or decrease the infrared viewability thereof by an infrared detector comprising the steps of:

positioning an infrared radiation absorbing layer between the infrared radiation source and the infrared detector such that the infrared radiation absorbing layer is in infrared radiation absorbing relation and proximate to the infrared radiation source and further wherein the infrared absorbing layer includes a phase change material selected from the group consisting of paraffinic hydrocarbons and plastic crystals which may be repeatedly cycled between phases.

2. The method according to claim 1 wherein the infrared radiation absorbing layer includes a phase change material.

3. The method according to claim 1 wherein the phase change material is microencapsulated.

4. The method according to claim 2 wherein the phase change material is selected from the group consisting of paraffinic hydrocarbons and plastic crystals.

5. The method according to claim 1 wherein the infrared radiation absorbing layer comprises a base material and a thermal energy absorbing material.

6. The method according to claim 5 wherein the base material is selected from the group consisting of fabrics, fibers, mesh, foam, wire, fiberglass, aircraft skin, rubber, wood, paint, varnish and metal.

7. The method according to claim 6 wherein the paraffinic hydrocarbons are microencapsulated.

8. The method according to claim 6 wherein the radiation absorbing layer is applied in a camouflage pattern.

9. The method according to claim 8 wherein the infrared radiation absorbing layer consists of a microencapsulated phase change material applied in a camouflage pattern.

10. The method according to claim 9 wherein the infrared radiation absorbing layer further includes microencapsulated phase change material applied in a camouflage pattern and wherein selected sections across the camouflage pattern contain different concentrations of phase change material.

11. The method according to claim 9 wherein the infrared radiation absorbing layer further includes at least two different microencapsulated phase change materials applied to respective areas of the radiation absorbing layer, each of the respective microencapsulated phase change materials having a different melting point.

12. The method according to claim 10 wherein the radiation absorbing layer further includes at least two different microencapsulated phase change materials applied to the respective areas of the radiation absorbing layer, each of the respective microencapsulated phase change materials having a different melting point.

13. A method of camouflaging an object emitting infrared radiation so as to alter or decrease the infrared viewability thereof by an infrared detector comprising the steps of:

positioning an infrared radiation absorbing layer between the infrared radiation source and the infrared detector such that the infrared radiation absorbing layer is in infrared radiation absorbing relation and proximate to the infrared radiation source, and further wherein the infrared radiation absorbing layer comprises a substrate having a microencapsulated paraffinic hydrocarbon applied thereto in a preselected pattern and wherein the paraffinic hydrocarbon may be repeatedly cycled between phases.

14. The method according to claim 13 wherein the infrared absorbing layer includes two types of microencapsulated paraffinic hydrocarbons applied in respective preselected areas.

15. The method according to claim 13 wherein the microencapsulated paraffinic hydrocarbon is applied in areas of varying concentration in preselected areas.

16. The method according to claim 14 wherein the microencapsulated paraffinic hydrocarbon is applied in areas of varying concentration in preselected areas.

* * * * *